(12) United States Patent
Benthien et al.

(10) Patent No.: US 9,415,552 B2
(45) Date of Patent: Aug. 16, 2016

(54) METHOD FOR THE MANUFACTURE OF A FIBRE COMPOSITE COMPONENT, A SUPPORTING CORE, AND ALSO A FIBRE COMPOSITE COMPONENT

(71) Applicant: Airbus Operations GmbH, Hamburg (DE)

(72) Inventors: Hermann Benthien, Hamburg (DE); Axel Soeffker, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 595 days.

(21) Appl. No.: 13/886,415

(22) Filed: May 3, 2013

(65) Prior Publication Data

US 2013/0302544 A1    Nov. 14, 2013

Related U.S. Application Data

(60) Provisional application No. 61/645,663, filed on May 11, 2012.

(30) Foreign Application Priority Data

May 11, 2012    (DE) .......................... 10 2012 207 950

(51) Int. Cl.
*B29D 22/00* (2006.01)
*B29C 70/44* (2006.01)
*B29D 99/00* (2010.01)

(52) U.S. Cl.
CPC .............. *B29D 22/00* (2013.01); *B29C 70/446* (2013.01); *B29D 99/0014* (2013.01); *Y10T 428/13* (2015.01)

(58) Field of Classification Search
CPC .. B29D 22/00; B29D 99/0014; B29C 70/446; Y10T 428/13
See application file for complete search history.

(56) References Cited

U.S. PATENT DOCUMENTS

| 2008/0193709 A1 | 8/2008 | Han |
| 2008/0302912 A1 | 12/2008 | Yip et al. |
| 2011/0076461 A1 | 3/2011 | Jacob et al. |

FOREIGN PATENT DOCUMENTS

| DE | 102006031335 | 1/2008 |
| DE | 102008032834 | 1/2010 |

(Continued)

OTHER PUBLICATIONS

European Search Report, Aug. 13, 2015.

(Continued)

*Primary Examiner* — Michael C Miggins
(74) *Attorney, Agent, or Firm* — Greer, Burns & Crain Ltd.

(57) ABSTRACT

A method for the manufacture of a fiber composite component reinforcement section, which bounds a cavity, whereby a supporting core, with an elastic sleeve bounding an interior space, is temporarily positioned in the cavity. The steps include: laying down fibrous material on a base molding tool to form a base element of the fiber composite component, draping fibrous material in a negative mold, arranging the supporting core on an inner surface of the fibrous material in the negative mold, positioning the negative mold fitted with the fibrous material and the supporting core, on the base element to form the reinforcement section, forming a vacuum chamber accommodating the negative mold and the base element by covering with a vacuum film, evacuating the vacuum chamber, and curing the fibrous material, whereby when using a dry fibrous material, a matrix material is injected into the fibrous material after the evacuation.

16 Claims, 6 Drawing Sheets

(56) References Cited

FOREIGN PATENT DOCUMENTS

| DE | 102008044069 | 8/2010 |
| DE | 102009040528 | 4/2011 |
| DE | 102011101450 | 11/2012 |
| DE | 102011101456 | 11/2012 |

OTHER PUBLICATIONS

German Search Report, May 11, 2012.

METHOD FOR THE MANUFACTURE OF A FIBRE COMPOSITE COMPONENT, A SUPPORTING CORE, AND ALSO A FIBRE COMPOSITE COMPONENT

CROSS-REFERENCES TO RELATED APPLICATIONS

This application claims the benefit of the U.S. Provisional Application No. 61/645,663, filed on May 11, 2012, and of the German patent application No. 10 2012 207 950.5 filed on May 11, 2012, the entire disclosures of which are incorporated herein by way of reference.

BACKGROUND OF THE INVENTION

The invention concerns a method for the manufacture of a reinforcement section of a fibre composite component, which bounds a cavity, whereby a supporting core with an elastic sleeve bounding an interior space is temporarily positioned in the cavity. Furthermore the invention has as its subject a supporting core for the manufacture of a hollow reinforcement section of a fibre composite component, with an elastic sleeve that bounds an interior space on all sides. In addition the invention concerns a fibre composite component.

From the prior art a multiplicity of methods for the manufacture of fibre composite components with integrally designed stiffening profiles are of known art.

For the manufacture of, for example, a spherically curved pressure bulkhead of an aircraft fuselage cell a suitable fibre composite plastic is firstly laid down on an appropriately curved moulding tool, and is cured in an autoclave with the simultaneous application of pressure and temperature. For the purpose of forming the necessary integral stiffening ribs, supporting bodies with the desired cross sectional geometry made from foam plastic are bonded onto the prefabricated bulkhead; these supporting bodies are finally overlaid with a fibre composite plastic and cured to form a complete pressure bulkhead.

From DE 10 2008 044 069 B3 a mould for the production of fibre composite components with integral stiffening profiles is of known art. The mould of prior known art is at least partially formed with paper and/or cardboard materials, such that moulds can be provided in a large range of geometries.

SUMMARY OF THE INVENTION

The object of the invention is therefore in the first instance to specify an optimised method for the manufacture of an integrally reinforced fibre composite component that can withstand high mechanical loads and is optimised in terms of weight. In addition it is an object of the invention to specify an optimised supporting core for the manufacture of such a fibre composite component, and also to specify such a fibre composite component.

This object is achieved in the first instance by means of a method with the following steps:

a) laying down fibrous material on a base moulding tool to form a base element of the fibre composite component, b) draping fibrous material in a negative mould, c) arranging the supporting core on an inner surface of the fibrous material of the reinforcement section in the negative mould, d) positioning the negative mould, fitted with the fibrous material and the supporting core, on the base element to form the reinforcement section, e) forming a vacuum chamber accommodating the negative mould and the base element by covering these by means of a vacuum film, f) evacuating the vacuum chamber, and g) curing the fibrous material, whereby when using a dry fibrous material a matrix material, in particular a resin material, is injected into the fibrous material after the evacuation.

In step a) of the method, a base element is firstly manufactured; this can, for example, take the form of a skin field of a shell segment, a pressure bulkhead for an aircraft fuselage cell, or a wing shell. In step b) of the method, further fibrous material is laid down on a negative mould; which reproduces as exactly as possible the reinforcement section that is to be produced integrally with the base element. In step c) of the method, a supporting core is placed on the further fibrous material laid down on the negative mould. In step d) of the method, the negative mould, fitted with the further fibrous material and the supporting core, is then turned upside down, i.e., it is positioned overhead on the base element so as to form the reinforcement section in the required region. In step e) of the method, a vacuum chamber is created by covering the negative mould and the base element completely with a vacuum film such that it is impervious to fluids. In step f) of the method, the evacuation of the vacuum chamber takes place, and in the final step g) of the method, the fibrous material is cured, whereby in the case in which dry fibrous material is used the same is infiltrated with a suitable matrix material, in particular with a thermosetting plastic resin material. Furthermore thermoplastics and/or elastomers are, for example, also suitable as matrix materials.

Outside the vacuum chamber and inside the supporting core the same pressure always prevails during the whole course of the method. By means of this pressure equilibrium between the interior space of the supporting core and the normal ambient air pressure load on the vacuum film of approximately 1 bar (1013 hPa) at sea level the negative mould is prevented from pressing with high force onto the fibre laminate of the base element; this is undesirable, in particular in the case of a "wet" fibrous material (a so-called "prepreg" material), on account of the deformations thereby caused. The pressure equilibrium can for example be achieved with a supporting body in the form of a tube that is closed at both ends and is subjected to normal ambient air pressure. Alternatively a supporting body can be provided, which is likewise closed at both ends, but is connected with the environment via a pressure line. Furthermore a supporting body can be provided that is open at least at one end, the interior space of which is likewise subjected to ambient air pressure.

The inventive method enables the manufacture in only one operation (a so-called "one-shot" method), using a reliable process in which dimensions are maintained, of a fibre composite component that can be subjected to high mechanical loads, with at least one integrally designed, hollow reinforcement section. The base element and also the reinforcement section can hereby be formed with a pre-impregnated, non-cured fibrous material (a so-called "pre-preg" material) and/or with a fibrous material containing just dry reinforcing fibres with an optional binding agent. Moreover, by means of hook-and-loop interfaces the location of the reinforcement sections on the base element, for example on a bulkhead of a pressure compartment of an aircraft, is significantly simplified.

In accordance with a preferred configuration of the method the vacuum chamber is placed in an autoclave before the curing procedure.

By this means the mechanical pressure acting on the fibrous material of the reinforcement section, on the fibrous material tube, and also on the fibrous material of the base element, can be significantly increased, since in comparison to the normal ambient air pressure of approximately 1 bar, a pressure that is up to 10 times higher prevails in the interior space of an autoclave, that is to say an autoclave pressure of up to 10 bar. Therefore as a result of the deployment of the autoclave an even greater compression of the fibrous material ensues; this leads to a further improvement of the mechanical properties of the fibre composite component that is being manufactured. Also with the deployment of an autoclave the same pressure always prevails in the supporting body as that outside the vacuum chamber, i.e., in the interior space of the autoclave. This pressure equalisation can, for example, be effected by means of a fluid line, such as, for example, a pipe or a tube between the supporting core, which is otherwise impervious to fluids, and the interior space of the autoclave.

In addition an autoclave temperature of, e.g., up to 175° C., greatly increased in comparison to a room temperature of 20° C., permits an improvement of the mechanical properties of the fibrous material infiltrated with the resin material, i.e., of the finished fibre-reinforced plastic (a so-called "FRP"), in particular by virtue of an optimised wetting procedure.

In accordance with a development of the method provision is made, during the evacuation of the vacuum chamber, for the sleeve of the supporting core to be drawn against an inner surface of the reinforcement section.

By this means an effective compaction of the fibrous material of the reinforcement section ensues in the interaction between the negative mould and the supporting core.

In a preferred development of the method the supporting core is removed from the finished fibre composite component after the curing procedure.

By this means a considerable weight reduction ensues; this is of singular importance, in particular for aerospace applications. Moreover in terms of the structural mechanics no components remain that are superfluous and just add to the weight, and which moreover could become detached and hereby cause further problems.

In accordance with a further configuration of the method the sleeve is covered with a release film, at least in some regions. By this means, after the fibre composite component has been completely cured, the supporting core can be removed from the reinforcement section without any problems.

In a further configuration of the method provision is made for the release film and/or the sleeve to be covered with a fibrous material tube before it is positioned in the negative mould. By this means in particular the gussets in the bonding region between the fibrous material of the reinforcement section and the fibrous material of the base element can be optimised in terms of their mechanical load-bearing capacity.

In a further development of the method provision is made for a recess to be introduced into the fibrous material tube, which recess faces towards the base element.

By this means it is possible to avoid, at least in some regions, a weight-increasing thickening of the fibrous material in the region of the base element as a result of the fibrous material tube.

In accordance with a further configuration of the method provision is made for the fibrous material of the reinforcement section, the fibrous material tube, and/or the base element to have hook-and-loop interfaces in their reciprocal bonding regions, at least in some regions.

By this means, over and above the purely adhesive bonding, a form-fit connection between the fibrous material tube, the reinforcing layers of the reinforcement section, and also the reinforcing layers of the base element is possible, at least in some regions, as a result of which so-called "peeling effects" in the bonding regions are significantly less likely to occur. Moreover the tendency for cracks to form is reduced, as is the crack propagation velocity. Furthermore the ability of the fibre composite component to withstand the impacts of foreign bodies (the so-called "impact strength") is considerably enhanced.

In accordance with a development of the method provision is made for the resin material injected into and/or inhabiting the fibrous material to be displaced with a driver agent so as to create a foam material, at least in some regions, and in the curing procedure to fill intermediate spaces, in particular gussets, which are formed between the reinforcement section, the fibrous material tube, and/or the base element.

By this means it is possible, in particular for purposes of tolerance compensation, to fill even larger intermediate spaces, or cavities, such that they are free of voids, i.e., free of air inclusions, without any noteworthy impairment of the mechanical strength of the bonding regions. Hereby any hook-and-loop interfaces integrated into the fibrous material and, if necessary, interlocked with one another in a form fit, act in terms of the structural mechanics as a highly effective fibrous reinforcement of the foam material.

In a development of the method provision is made for the intermediate spaces to be bridged, at least partially, by means of hook-and-loop interfaces that hook into one another in a form fit, with the formation of hook-and-loop connections.

By this means the risk of peeling of fibrous material in the vicinity of the bonding regions can be significantly reduced. The hook-and-loop interfaces deployed, e.g., with open, hook-shaped fibrous sections of the reinforcing fibres of the fibrous material and/or with separate hook-and-loop interfaces additionally introduced into the fibrous material, such as, e.g., hook tapes and mushroom tapes, can be formed from a suitable material.

Furthermore the object in accordance with the invention is achieved with a supporting core whereby the sleeve, at least in some regions, is covered with a fibrous material tube, which is provided, at least in some regions, with at least one hook-and-loop interface. As a result of the hook-and-loop interface of the fibrous material tube a mechanically optimal connection ensues between the fibrous material of the reinforcement section, the fibrous material tube, and also the fibrous material of the base element, since in addition to the purely adhesive action of the adhesive bonds, in particular in the two gusset regions, a high resistance to peeling ensues as a result of the form-fit hook-and-loop connection.

During the whole of the evacuation process and the curing process, subsequently or simultaneously occurring in the autoclave the normal ambient air pressure of 1 bar, or the particular autoclave pressure, prevails in the interior space of the sleeve of the supporting core, such that the supporting core sleeve including the fibrous material sleeve, by virtue of the reduced pressure that is present in the region of the outer surface of the negative moulding tool, is already pressed on all sides with a high force from within against the fibrous material of the reinforcement section.

If the vacuum chamber is not placed in an autoclave, both ends of the sleeve then can be sealed in a suitable manner such that they are impervious to fluids, so that in the interior space of the supporting core sleeve the normal ambient air pressure of approximately 1 bar prevails during the course of the method.

In order to intensify the compression of the fibrous material the whole of the vacuum chamber can be introduced into an autoclave. In order to ensure a pressure equilibrium at all times between the autoclave pressure and the interior space of the supporting core, the interior space of the sleeve, which is otherwise impervious to fluids, is connected with the interior space of the autoclave via a suitable fluid connection, for example a pipe or hose that can withstand a sufficient load (a so-called communicating system). This line connects the sleeve of the supporting core, otherwise sealed at both ends, for example by means of plugs, or by means of walls formed at the ends of the sleeve, with the interior space of the autoclave. In all cases it must be ensured that there is no fluid connection between the vacuum chamber and the interior space of the autoclave and/or the supporting core, and accordingly, no pressure equalisation is possible. By virtue of this communicating system and the pressure equilibrium hereby effected, the pressure forces acting on the negative mould are likewise compensated against one another, since the autoclave pressure of up to 10 bar prevails both outside the vacuum chamber, i.e., the vacuum film, and inside the supporting core sleeve.

In a development of the supporting core provision is made for a release film to be arranged between the fibrous material tube and the sleeve, at least in some regions.

By this means it is possible for the supporting core to be removed more easily after the curing process from the interior space of the cured hollow reinforcement section of the integral fibre composite component; this is particularly advantageous in the case of a vacuum chamber that is not embodied in a "self-releasing" manner. In addition to the release film at least one so-called "peel ply" or "bleeder" is preferably integrated, at least in some regions, into the total structure, as a result of which the "venting," i.e., the process of evacuating the vacuum chamber, can be intensified, and by this means can be further optimised.

In accordance with one configuration a cross-sectional geometry of the sleeve is pre-formed, at least in some sections, and approximately corresponds with the required cross-sectional geometry of the cavity of the reinforcement section that is to be formed.

By virtue of the extensively pre-formed sleeve the necessity of expansion movements in the course of the extension of the sleeve is reduced; in particular this leads to a reduction of sliding movements between the fibrous material tube and the fibrous material of the reinforcement section and/or the fibrous material of the base element during the evacuation process, and also during the autoclave procedures.

In a further configuration provision is made for the sleeve to be formed with an elastomer, in particular with a silicon and/or with a silicon foam.

This ensures that the sleeve can expand radially on all sides in an even manner during the evacuation of the vacuum chamber. In addition by virtue of the anti-stick properties of silicon, which as a rule are extremely good, the necessity for the deployment of release films can be reduced.

In addition the inventive object is achieved by means of a fibre composite component in that a base element and at least one reinforcement section with a fibrous material tube, have in their reciprocal bonding regions, in particular in gussets, hook-and-loop connections formed with hook-and-loop interfaces, at least in some regions; these connections are infiltrated with a matrix material, in particular with a foam material and/or with a resin material.

By this means it is possible to fill intermediate spaces, in particular the gussets and fillets that are caused by production processes, in a manner that is free of voids, and thus to implement tolerance compensation. In addition a form-fit connection of bonding regions bordering on each other is possible with the aid of the hook-and-loop interfaces. This leads, inter alia, to a high peeling resistance in the bonding regions of the finished fibre composite component. In addition the hook-and-loop connections restrict the tendency for cracks to form and also the propagation of cracks that are already present, and finally improve the resistance to the impacts of foreign bodies that encounter the fibre composite component at high velocity.

DETAILED DESCRIPTION OF THE PREFERRED EMBODIMENTS

In the figures the same design elements have the same reference numbers in each case.

FIGS. 1 to 5 illustrate schematically the course of the method with the aid of an inventive supporting core for the manufacture of a fibre composite component with an integrally designed hollow reinforcement section.

Figure 1:
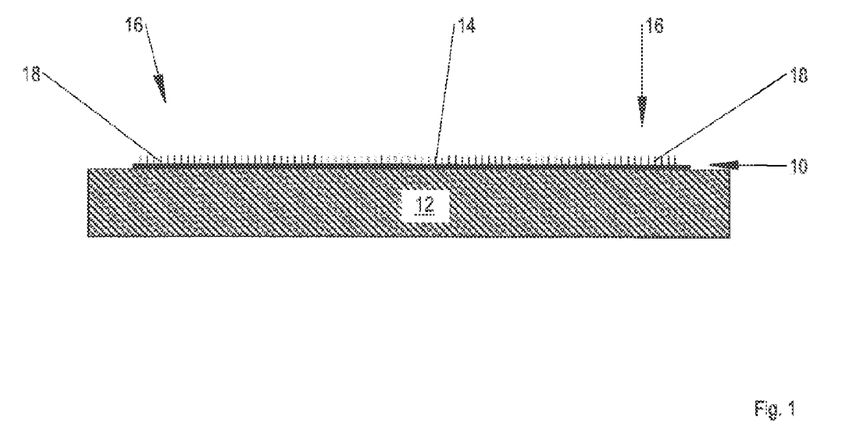
FIGS. 1-5 show a schematic representation of the course of the method.

Firstly in accordance with FIG. 1 a fibrous material 10 is laid down on a base moulding tool 12 to form a base element 14 of the fibre composite component to be manufactured. The base element 14 has a bonding region 16 with a hook-and-loop interface 18. The fibrous material 10 can be formed with any desired pre-impregnated arrangement of reinforcing fibres (a so-called "pre-preg" material) and/or with any desired arrangement of dry reinforcing fibres as reinforcement; these are only subsequently infiltrated with a suitable matrix material, in particular with a thermosetting plastic resin material. In a deviation from the planar geometry of the base moulding tool 12 and the base element 14 as shown, these can have any desired one and/or two-dimensional (spherical) curved surface geometry, at least in some sections.

The resin material can if required be foamed, at least in some regions, in particular for the purpose of filling gaps in the course of tolerance compensation, and/or the fibrous material is infiltrated, at least in some sections, with a foam material that has already been foamed. The arrangement of the reinforcing fibres is preferably built up from carbon fibres as a weave, a mat (a so-called "multi-axial mat") and/or as individual strands of filaments (so-called "unidirectional material" or "rovings"), For purposes of forming a matrix in the arrangement of reinforcing fibres, i.e., as a resin material, thermosetting plastics, such as, for example, epoxy resins, BMI resins, polyester resins, or phenol resins, are preferably deployed. In principle thermoplastics and/or elastomers can also be deployed, at least in some parts, as the matrix material, i.e., as matrix creators. In such a configuration the "curing procedure" takes place in the last step of the method, in general by means of a cooling process for the thermoplastic matrix material after its earlier plasticisation and moulding with the aid of the negative mould, the supporting core and base moulding tool, with the appropriate application of heat.

The hook-and-loop interface 18 can, for example, be formed by the unpicking of reinforcing fibre sections of the fibrous material. By this means it is possible, for example, to form hooks and loops, which interlock with one another in a form fit, if the bonding regions that are reciprocally thus equipped are brought into contact. Furthermore it is possible to form the hook-and-loop interface 18 for example by the integration of a separate sufficiently temperature-resistant hook tape, and/or a mushroom tape, into the fibrous material 10, independently of the reinforcing fibres, i.e., of the arrangement of reinforcing fibres in the fibrous material.

Figure 2:
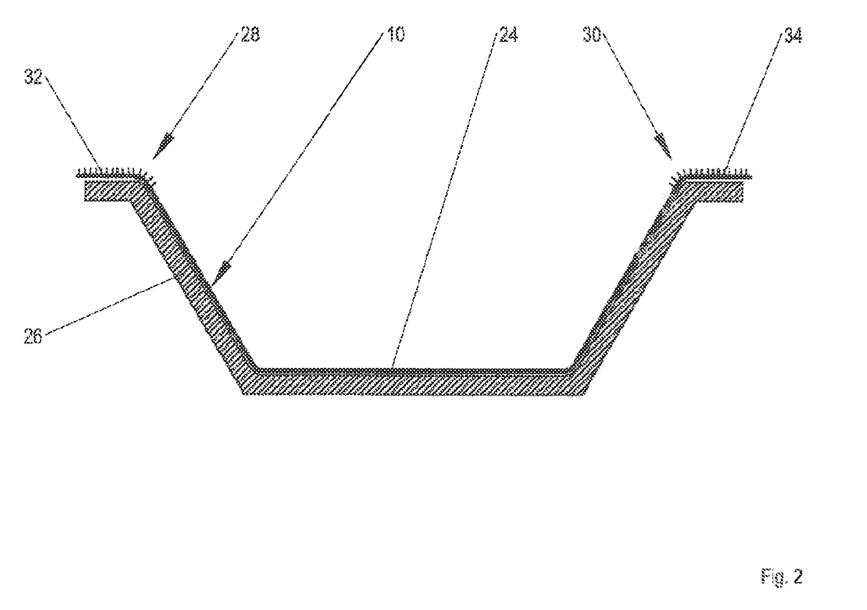

In a further step of the method according to FIG. 2 further fibrous material 10 is laid down in a negative mould 26, i.e., is draped in the latter without any folds, so as to form a hollow reinforcement section 24. An undesignated cross-sectional geometry of the negative mould 26 approximately corresponds to the cross-sectional geometry of the reinforcement section 24 to be formed. The reinforcement section 24 has, for example, a hook-and-loop interface 32, 34 in each of its two flange-type bonding regions 28, 30. Instead of the fibrous material 10 another suitable fibrous material can also be used for the reinforcement section 24. However, the use of the same fibrous material 10 as that used for the manufacture of the base element 14 has the advantage that it is possible to manufacture an adhesive bond between the base element 14 and the reinforcement section 24 that is particularly able to withstand mechanical loads by virtue of the identical nature of the materials. A sub-section of the hook-and-loop interfaces 32, 34 of the bonding regions 28, 30 of the reinforcement section 24 extends on both sides up into the undesignated trough-shaped depression of the negative mould 26, in particular so as to achieve a form-fit interlocking action in the region of gussets, i.e., hollow fillets, between the reinforcement section 24, the supporting core and the base element 14 by means of the hook-and-loop interfaces 32, 34.

Figure 3:
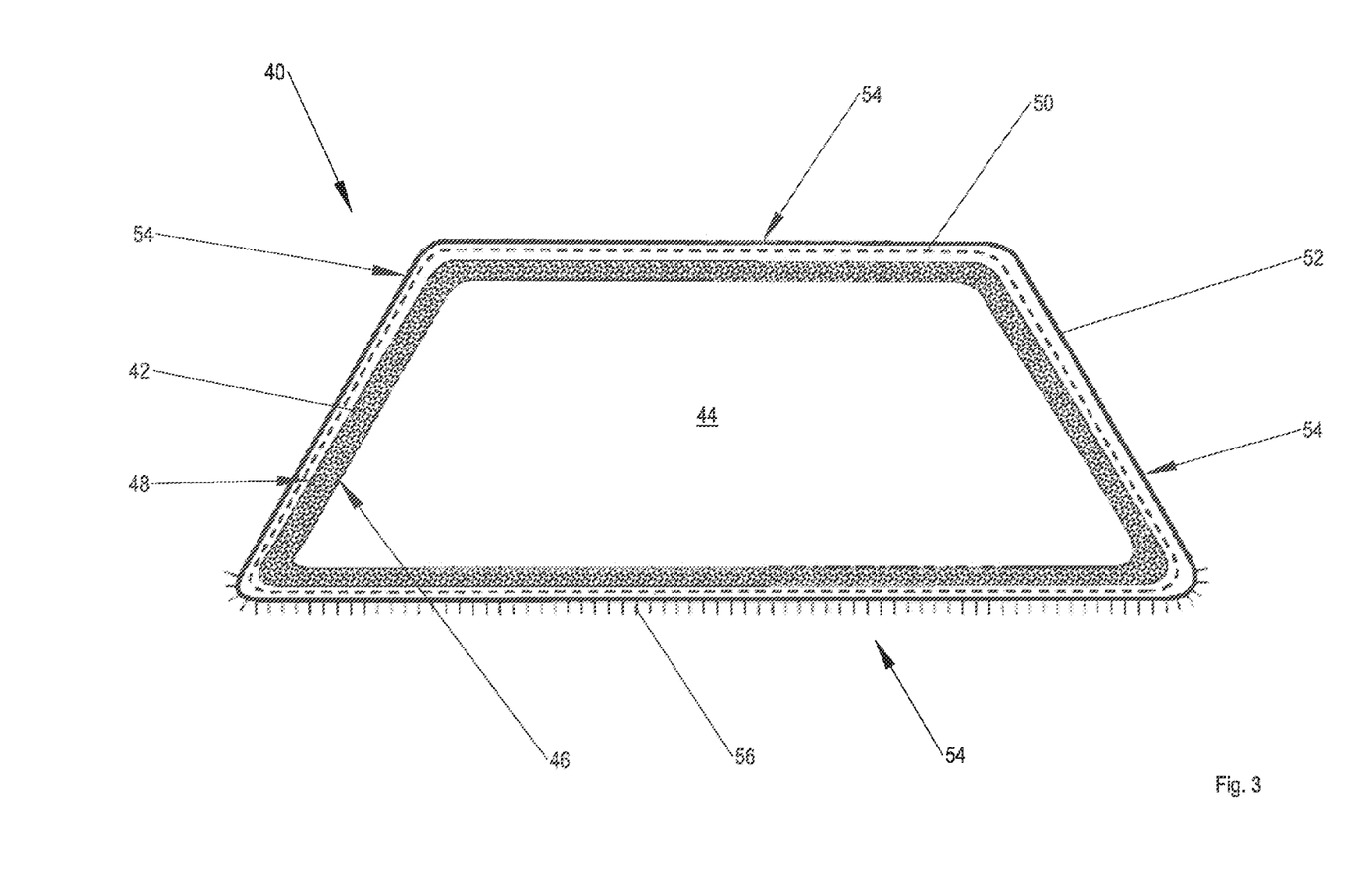

FIG. 3 shows a simplified cross-sectional representation of a supporting core 40 deployed for the execution of the method. An elastic, i.e., flexible, sleeve 42 of the supporting core 40 bounds an interior space 44 on all sides.

A cross-sectional geometry of the sleeve 42 approximately corresponds to the cross-sectional geometry of an interior space of the reinforcement section 24 to be manufactured. The sleeve 42 is preferably formed with an elastomer, such as, for example, a silicon and/or a silicon foam. It has an inner surface 46 and also an outer surface 48, whereby an undesignated wall thickness of the sleeve 42 is approximately constant over its periphery. The outer surface 48 is preferably overlaid with a release film 50, which for its part is here completely encased in a fibrous material tube 52. The fibrous material tube 52 features, at least in a bonding region 54, a hook-and-loop interface 56 facing towards the base element 14. In addition to the release film 50 further functional layers can be provided, such as, for example, a fleece layer, i.e., a drainage layer, for purposes of optimising the evacuation process, and/or a tear-off layer.

In the course of the method the sleeve 42 of the supporting core 40 is firstly provided with the release film 50, and is then surrounded with the fibrous material tube 52. The fibrous material tube 52 is preferably formed from the same fibrous material 10 as is used for the manufacture of the base element 14 or the reinforcement section 24. Both the release film 50 and also the fibrous material tube 52 feature sufficient elasticity so as to enable a radial expansion of the elastic sleeve 42 of the supporting core 40 that is as unhindered as possible on all sides in the course of the production process. In the example of embodiment shown in FIG. 3 the supporting core 40 features a trapezoidal cross-sectional geometry so as to enable, for example, the formation of "Q-stringers" as the hollow reinforcement sections on the base element 14.

The supporting core 40 comprises two undesignated opposingly inclined side sections, which in each case merge into a floor section and a ceiling section, which are likewise undesignated. The underside hook-and-loop interface 56 of the bonding region 54 runs along the floor section and is also partially formed on the side sections so as to achieve a form-fit interlocking action in addition to the adhesive bonding action in the finished fibre composite component, in particular in the region of the gussets formed between the supporting core 40, the reinforcement section 24 and the base element 14, as determined by the geometry. The adhesive bonding of the supporting core 40 to the base element 14 and the reinforcement section takes place over the complete peripheral bonding section 54 of the supporting core 40, including the bonding section 54 with the hook-and-loop interface 56.

In a further step of the method, not represented in the figures, the supporting core 40, including the fibrous material tube 52 and the release film 50, is laid into the negative mould 26. In order to be able to insert the supporting core 40 into the negative mould 26 represented in FIG. 2 the supporting core 40 from FIG. 3 is rotated through 180°, i.e., it is inserted overhead into the negative mould 26.

Figure 4:
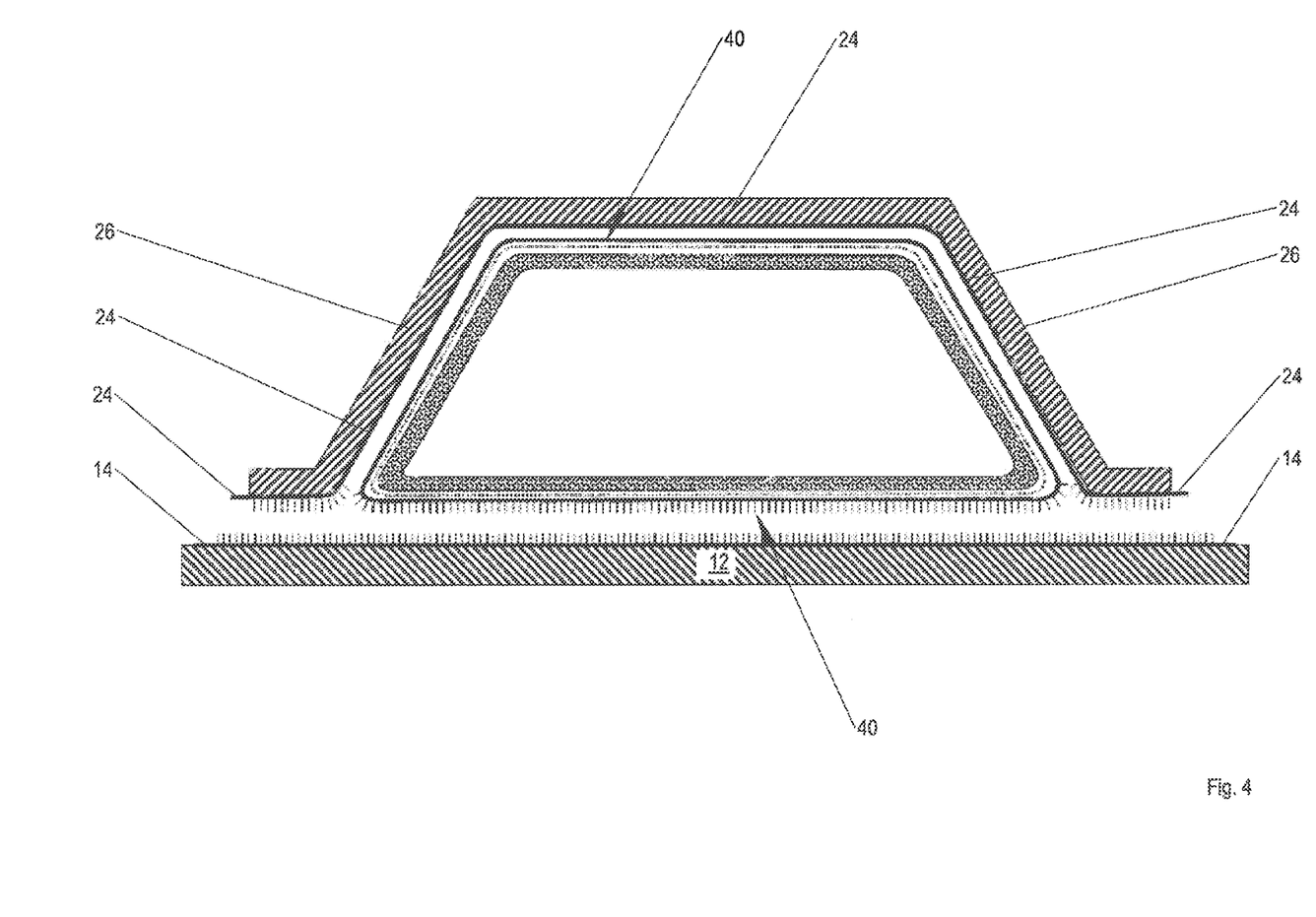

In accordance with FIG. 4 in a further step of the method the negative mould 26, together with the now therein located supporting core 50 and the reinforcement section 24, is turned upside down, i.e., it is positioned "overhead," above the base element 14 already laid down on the base moulding tool 12. The hook-and-loop interfaces hereby simplify both the positioning and also the location.

In accordance with FIG. 5, in a further step of the method the negative mould 26, together with the therein located reinforcement section 24 and the supporting core 24 and also the base moulding tool 12 with the thereon located base element 14, are arranged one upon another, and are subsequently completely covered with a vacuum film 58 so as to generate a vacuum chamber 60 that is impervious to fluids.

Underneath the vacuum film 58 further optional functional layers can be introduced, at least in some regions, such as, for example, a fleece layer for easing the evacuation of the vacuum chamber 60, or a tear-off layer. The vacuum chamber 60 features a vacuum port 62 on its right-hand side, which can be connected with a vacuum source, not represented. Furthermore a left-hand side port 64 is provided, via which a matrix material, in particular a resin material, a foamable resin material and/or an already foamed foam material, can optionally be supplied, if the fibrous materials deployed have not previously been infiltrated with a resin material.

The curing procedure preferably takes place in an autoclave, not represented, so that outside the vacuum chamber 60 an autoclave pressure prevails that is increased relative to normal ambient factor by up to a factor 10. Alternatively the curing process can also take place without an autoclave under normal atmospheric conditions (air pressure Pambient 1 bar, ambient temperature Tambient 20° C.).

As a result of the evacuation of the vacuum chamber 60 via the vacuum port 62 the sleeve 42 of the supporting core 40 is at the same time expanded with a large force developing in the radial direction, since in the interior space 44 of the supporting core 40 at least the normal ambient air pressure of approximately 1 bar or the autoclave pressure of up to 10 bar is present, to a large extent unaltered, and these pressures remain approximately constant over the duration of the method. By this means the fibrous material of the fibrous material tube 52 including the there under located release film 50 is pressed with a large force against an inner surface 66 of the reinforcement section 24 on all sides, such that an inner adhesive bonding ensues.

As a consequence of these twin forces acting at the same time from inside and from outside onto the fibrous materials of the reinforcement section 24, the fibrous material tube 52 and also the base element 14, an effective compaction and removal of air from the fibrous materials ensues in conjunction with the evacuation of the vacuum chamber 60 simultaneously taking place and the normally high autoclave pressure of up to 10 bar. In addition the process leads to a form-fit intermeshing of the hook-and-loop interfaces 18, 32, 34, 56 in the bonding regions 16, 28, 30, 54 and also to a reciprocal form-fit interlocking in the region of two gussets 68, 70, with the creation of a multiplicity of hook-and-loop connections, each undesignated. At the same time as a result of the radially expanding sleeve 42 of the supporting core 40, the hook-and-loop interface 56 of the bonding region 54 of the fibrous material tube 52 is driven with force into the two gussets 68, 70, as a result of which in this zone, which is particularly relevant in terms of the structural mechanics, an inner form-fit interlocking of the hook-and-loop interface 56 of the bonding surface 54 of the supporting core 40 ensues with the other hook-and-loop interfaces 18, 32, 34 of the base element 14 and also of the reinforcement section 24. Notwithstanding these events at the same time an adhesive bond that can withstand high mechanical loads is formed between the reinforcement section 24 and the fibrous material tube 52 and also the base element 14.

As a consequence of the combination thus created of a form-fit interlocking action and an adhesive bonding action the peeling resistance of the connection between the reinforcement section 24, the fibrous material tube 52, and the base element 14 is in particular significantly increased. In addition the impact strength is increased, while at the same time the tendency for crack formation is in general minimised, as is the propagation velocity of any cracks. The interlocking connections moreover ensure a security of location of the reinforcement section 24 on the base element 14 while the resin material is not yet completely cured, which is particularly important in the case of a strongly curved base element 14.

Also for the case in which two interlocking interfaces bordering on each other do not completely hook into one another in a form fit, the sections of the reinforcement fibres of the interlocking interface protruding into the resin material or foam material lead to a considerable increase in the mechanical strength in this region and create for practical purposes a fibre-reinforced resin or foam material.

Fibrous material that is initially still dry is infiltrated, i.e., impregnated, during the evacuation, and preferably before the introduction of the vacuum chamber 60 into an autoclave, with a suitable resin material via the port 64. The resin material deployed can if required at least in some sections be foamed with a driver agent, and/or an already at least partially foamed foam material is supplied via the port 64. By this means in particular tolerance compensation, in particular in the region of the hook-and-loop interfaces 18, 32, 34 and also 56, is simplified by virtue of the great ability of foam materials to fill gaps. The result is that it is thus possible to compensate in an ideal manner for any production inaccuracies between the base element 14 and the reinforcement section 24, including the fibrous material tube 52 of the supporting core 40. For the case in which the hook-and-loop interfaces 18, 32, 34, 56 are constructed with appropriately geometrically shaped sections of the reinforcement fibres of the fibrous material, for example in the form of books and loops that engage with one another, there ensues at the same time a fibre reinforced foam material, which in the region of the hook-and-loop interfaces 18, 32, 34, 56 allows a lightweight adhesive/form-fit joint to be formed between the base element 14 and the reinforcement section 24, including the fibrous material tube 52. The foam material, which is thus so to speak fibre-reinforced, thus enables compensation to be made for larger dimensional deviations also.

After complete infiltration, free of any voids, i.e., cavities, of any fibrous material that is still dry. at least in some regions, i.e., after complete evacuation of the vacuum chamber 60 and after a sufficient residence time of the vacuum chamber 60 in the autoclave, the curing process is complete, and a finished fibre composite component, constructed from the base element 14 and the integral reinforcement section 24 with the fibrous material tube 52, can be extracted from the autoclave. For purposes of final completion of the fibre composite component the vacuum film 58 and also the sleeve 42 of the supporting core 40, including the release film 50, are removed. Optionally this can be followed by further chemical and/or mechanical post-processing steps. The inventive method thus allows the manufacture, in a reliable process that is suitable for large-scale production, of a dimensionally stable fibre composite component with near-optimal mechanical properties, and with at the same time minimum weight.

Figure 5:
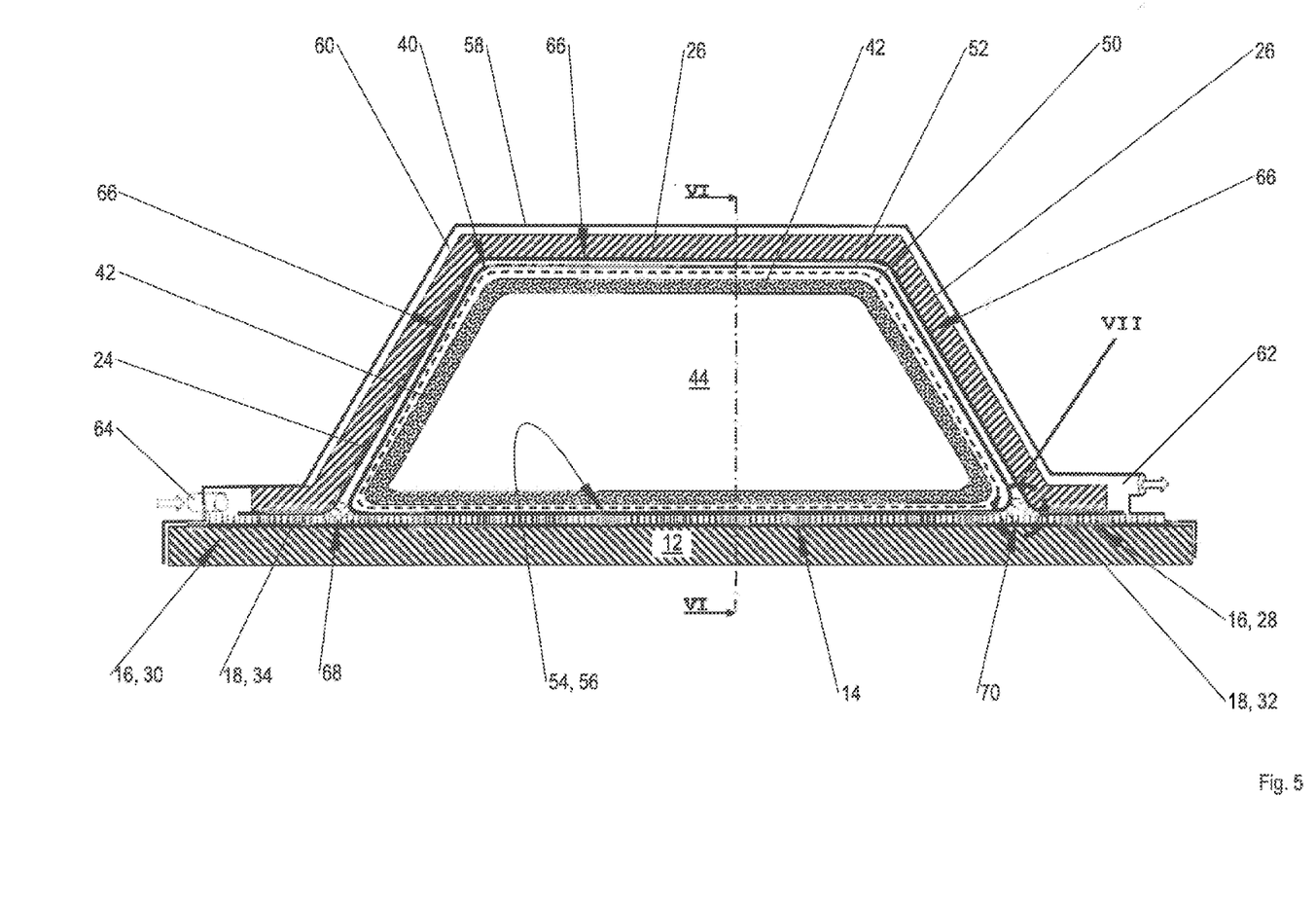
Figure 6:
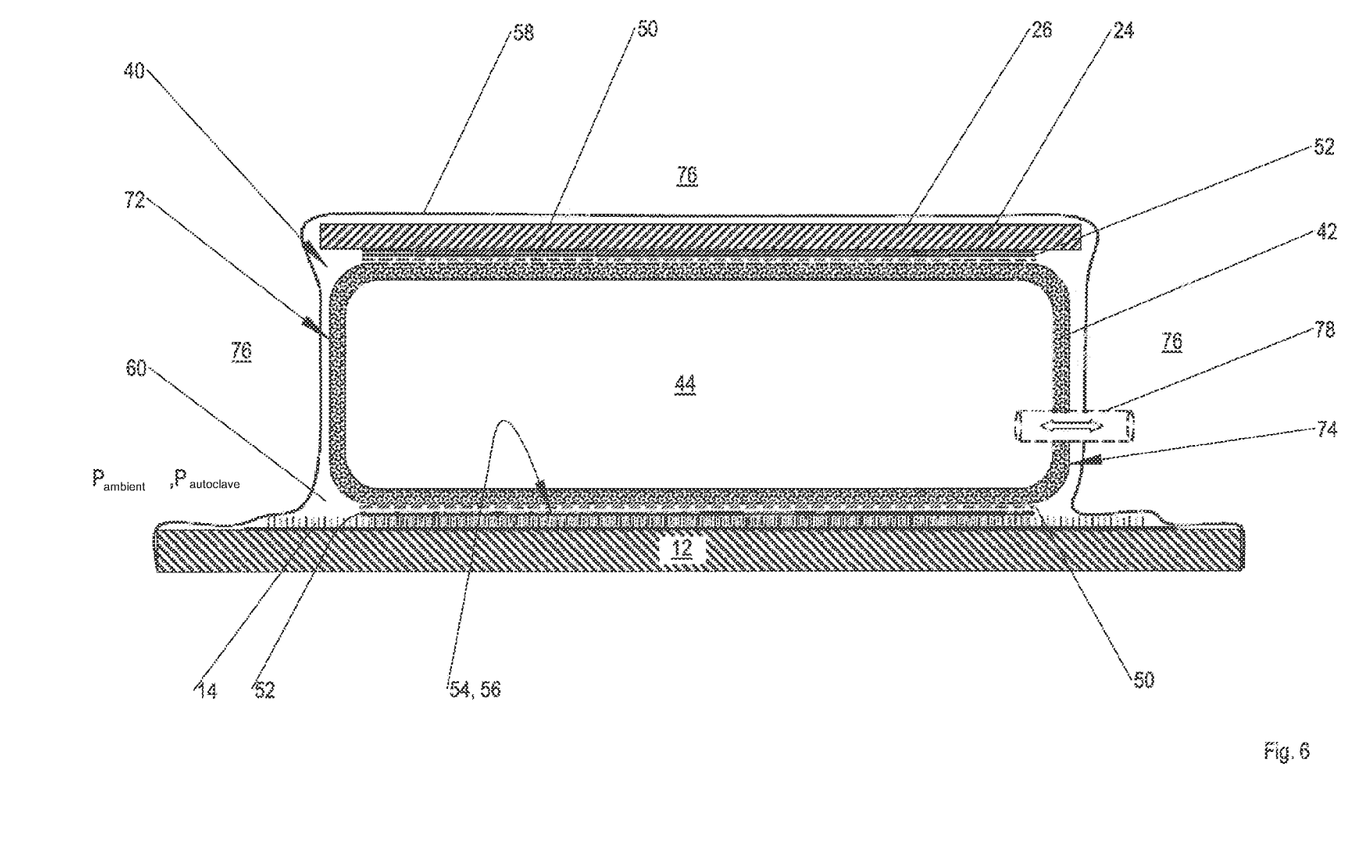
FIG. 6 shows a longitudinal section through the reinforcement section with the negative mould and base moulding tool along the section line VI-VI in FIG. 5.

FIG. 6 shows a longitudinal section through the reinforcement section with the negative mould and the base moulding tool along the section line VI-VI in FIG. 5.

The supporting core 40 with the sleeve 42, the release film 50, and also the fibrous material tube 52, with the bonding region 54 and the hook-and-loop interface 56, runs between the base element 14 located on the base moulding tool 12 and the reinforcement section 24 located against the inner side of the negative mould 26. Both ends 72, 74 of the supporting core 40 are closed such that they are impervious to fluids, so that in the interior space 44 for the case in which, e.g., the curing process takes place under normal atmospheric conditions (an air pressure of approximately 1 bar, an air temperature of approximately 20° C.) the normal ambient air pressure Pambient of 1 bar prevails. Alternatively the sleeve 42 can also be designed, e.g., to be open at both ends, i.e., in the form of a tube, whereby plugs, not represented, can then be introduced and sealed into the ends 72, 74. In contrast both undesignated ends of the reinforcement section 24 are preferably always configured to be open, in particular so as to enable the removal of the supporting core 40.

If on the other hand the vacuum chamber 60 formed with the vacuum film 58 for purposes of curing is placed completely in an autoclave, not represented, a pressure Pautoclave of up to 10 bar prevails in an exterior space 76 outside the vacuum chamber 60, i.e., in the interior space of the autoclave. In this case at least one fluid connection is then necessary so as to effect a pressure compensation between the interior space 44 and the exterior space 76; here this is embodied as a pipe 78, represented by a dashed line. By means of the at least one pipe 78 a communicating system is created, as indicated by the white double arrow, for purposes of pressure compensation between the interior space 44 and the exterior space 76. Here care must be taken to ensure that no fluid connection is created between the vacuum chamber 60 and the interior space 44 and/or the exterior space 76.

The result is that during the whole duration of the method, both in the case of a simple atmospheric curing procedure, and also in the case of a curing procedure in an autoclave the same pressure approximately prevails both in the interior space 44 of the supporting core 40 and also in the exterior space 76.

Figure 7:
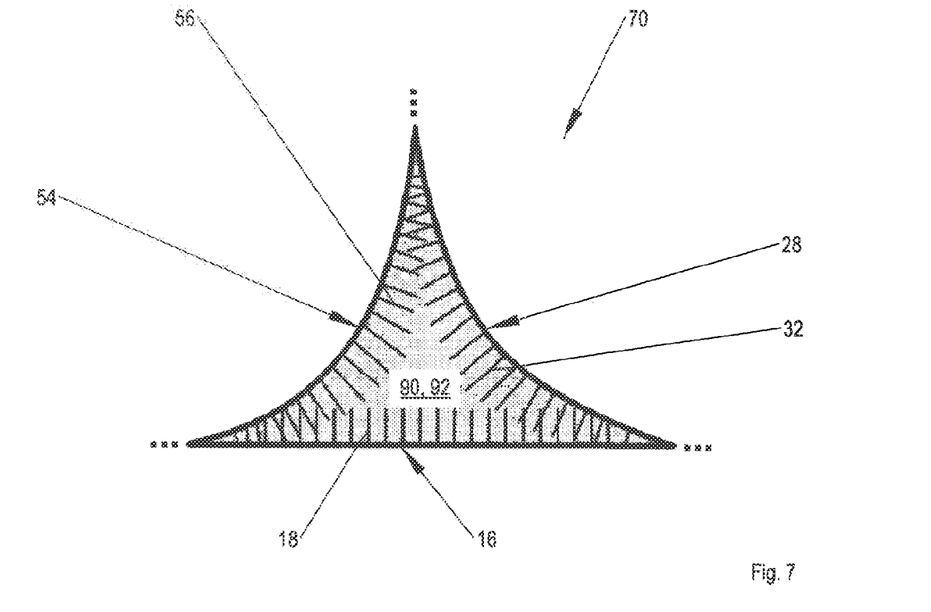
FIG. 7 shows a cross-sectional representation of a gusset from FIG. 5.

FIG. 7 shows a highly magnified schematic representation of the gusset 70 in the region of the detail VII from FIG. 5.

Between the three bonding regions 16, 28 and 54 in the region of the gusset 70 a form-fit interlocking action ensues on account of the hook-and-loop interfaces 18, 32, 56 at least in some sections. The gusset 70 is moreover completely filled with a resin material 90 and/or with a foam material 92, whereby the hook-and-loop interfaces 18, 32, 56 represent an at least partial fibrous reinforcement of the resin material or the foam material; in the case of the foam material 92 these also ensure a high mechanical load-bearing capacity with, at the same time, good ability to fill the volume.

Figure 8:
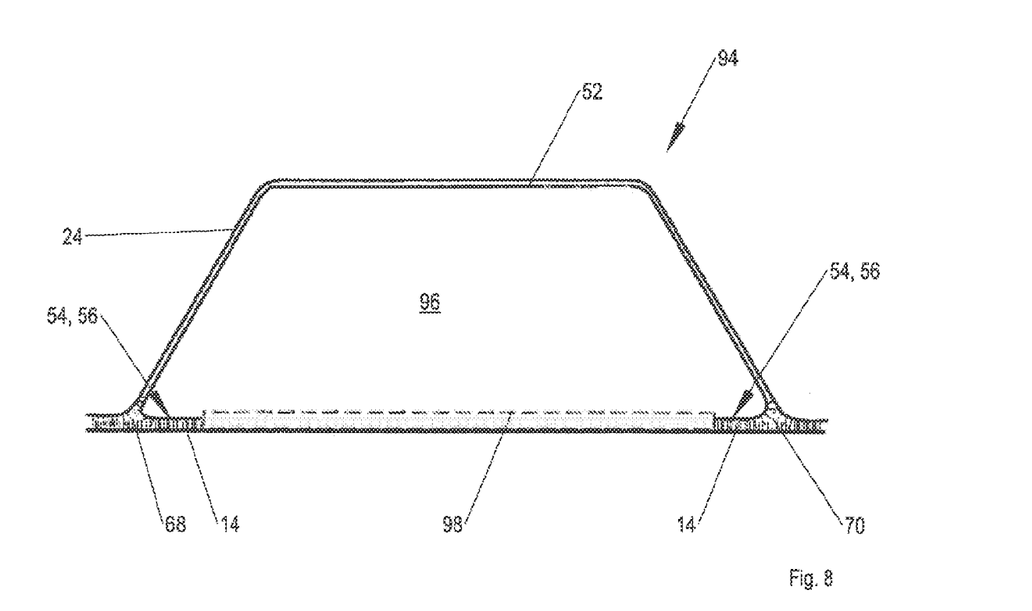
FIG. 8 shows a schematic representation in cross-section of the finished fibre composite component.

FIG. 8 shows a schematic cross-sectional representation through a finished fibre composite component manufactured in accordance with the method.

The cured fibre composite component 94 comprises the hollow reinforcement section 24, formed integrally with the base element 14, together with the fibrous material tube 52. Here the base element 14, the reinforcement section 24 and also the fibrous material 52 are joined together to form a permanent unit, i.e., they are adhesively bonded with one another and/or connected with one another by means of a so-called "form fit adhesive bond." In the ideal case the supporting core, negative mould and base moulding tool are completely removed, so that the reinforcement section 24, together with the fibrous material tube 52 and the base element 14, bound and define the desired, weight reducing cavity 96 on all sides.

For purposes of further weight reduction of the fibre composite component 94 the bonding region 54 of the fibrous material to 52 can have. i.e., can be interrupted by, a rectangular shaped recess 98 in the region of the hook-and-loop interface 56—as indicated by a dashed line—i.e., the fibrous material tube 52 has a longitudinal slit at right angles to the plane of the drawing. Accordingly the hook-and-loop interface 56 of the base element 14 can be omitted in this region.

In both gussets 68, 70 a form-fit interlocking connection exists. in addition to the adhesive bonding, between the reinforcement section 24, the fibrous material tube 52, and also the base element 14; in particular this leads to a greatly increased peeling strength in these zones (a so-called form-fit bonding).

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE SYMBOLS

10. Fibrous material
12. Base moulding tool
14. Base element
16. Bonding region
18. Hook-and-loop interface
24. Reinforcement section
26. Negative mould
28. Bonding region
30. Bonding region
32. Hook-and-loop interface
34. Hook-and-loop interface
40. Supporting core
42. Sleeve (supporting core)
44. Interior space (supporting core)
46. Inner surface (sleeve)
48. Outer surface (sleeve)
50. Release film
52. Fibrous material tube
54. Bonding region
56. Hook-and-loop interface
58. Vacuum film
60. Vacuum chamber
62. Vacuum port
64. Port (resin/foam)
66. Inner surface
68. Gusset
70. Gusset
72. End (supporting core)
74. End (supporting core)
76. Exterior space (vacuum chamber)
78. Tube
90. Resin material
92. Foam material
94. Fibre composite component
96. Cavity, void
98. Recess

The invention claimed is:

1. A method for the manufacture of a reinforcement section of a fibre composite component, which bounds a cavity, wherein a supporting core with an elastic sleeve bounding an interior space is temporarily positioned in the cavity, comprising the steps:
    a) laying down fibrous material on a base moulding tool to form a base element of the fibre composite component,
    b) draping fibrous material in a negative mould,
    c) arranging the supporting core on an inner surface of the fibrous material of the reinforcement section in the negative mould,
    d) positioning the negative mould fitted with the fibrous material and the supporting core on the base element to form the reinforcement section,
    e) forming a vacuum chamber accommodating the negative mould and the base element by covering by means of a vacuum film,
    f) evacuating the vacuum chamber, and
    g) curing the fibrous material, wherein when using a dry fibrous material a matrix material, in particular a resin material, is injected into the fibrous material after the evacuation,
    wherein the elastic sleeve is covered with a fibrous material tube which at least in some regions is provided with at least one hook-and-loop interface to provide a form-fit connection between at least one of the fibrous material of the reinforcement section, the fibrous material tube, or the fibrous material of the base element.

2. The method in accordance with claim 1, wherein the vacuum chamber is placed in an autoclave before the curing procedure.

3. The method in accordance with claim 1, wherein the sleeve of the supporting core during the evacuation of the vacuum chamber is drawn against an inner surface of the reinforcement section.

4. The method in accordance with claim 1, wherein after the curing procedure the supporting core is removed from the finished fibre composite component.

5. The method in accordance with claim 1, wherein at least one of the fibrous material of the reinforcement section, the fibrous material tube, and the base element have hook-and-loop interfaces in their reciprocal bonding regions, at least in some regions.

6. The method in accordance with claim 1, wherein a release film is arranged between the fibrous material tube and the sleeve, at least in some regions.

7. The method in accordance with claim 1, wherein a cross-sectional geometry of the sleeve is pre-formed, at least in some sections, and approximately corresponds with the required cross-sectional geometry of the cavity of the reinforcement section to be formed.

8. The method in accordance with claim 1, wherein the sleeve is covered with a release film, at least in some regions.

9. The method in accordance with claim 5, wherein at least one of the release film and the sleeve are covered with the fibrous material tube before the positioning in the negative mould.

10. The method in accordance with claim 9, wherein a recess is introduced into the fibrous material tube, which recess faces towards the base element.

11. The method in accordance with claim 1, wherein the resin material which is one of injected into and inhabiting the fibrous material, is displaced with a driver agent so as to create a foam material, at least in some regions, and in the curing procedure fills intermediate spaces, in particular gussets, which are formed between the reinforcement section and at least one of the fibrous material tube and the base element.

12. The method in accordance with claim 11, wherein the intermediate spaces are at least partially bridged by means of hook-and-loop interfaces hooking into one another in a form fit with the formation of hook-and-loop connections.

13. The method in accordance with claim 1, wherein the sleeve is formed with an elastomer.

14. The method in accordance with claim 13, wherein the sleeve is formed with one of a silicon and a silicon foam.

15. A fibre composite component, manufactured in accordance with claim 1, wherein a base element and at least one reinforcement section with a fibrous material tube in their reciprocal bonding regions have, at least in some regions, hook-and-loop connections formed with hook-and-loop interfaces, which are infiltrated with a matrix material.

16. A fibre composite component in accordance with claim 15, wherein the matrix material is one of a foam material and a resin material.

* * * * *